US012678355B2

(12) United States Patent
Feldman et al.

(10) Patent No.: US 12,678,355 B2
(45) Date of Patent: Jul. 14, 2026

(54) RECLINING ARMCHAIR WITH LIFTING SEAT AND EXTENDING FOOTREST

(71) Applicant: J&D FURNITURE LLC, Great Neck, NY (US)

(72) Inventors: Janet Schwartz Feldman, Great Neck, NY (US); Derek Feldman, Great Neck, NY (US); Aviv Rottenberg, Ramat Hasharon (IL); David Yassaf, Neve Yamin (IL); Gilad Davidi, Tel Aviv (IL); Alex Padwa, Tel Aviv (IL)

(73) Assignee: J&D FURNITURE LLC, Great Neck, NY (US)

( * ) Notice: Subject to any disclaimer, the term of this patent is extended or adjusted under 35 U.S.C. 154(b) by 0 days.

(21) Appl. No.: 18/193,449

(22) Filed: Mar. 30, 2023

(65) Prior Publication Data

US 2024/0099917 A1 Mar. 28, 2024

Related U.S. Application Data

(63) Continuation of application No. 17/393,141, filed on Aug. 3, 2021, now Pat. No. 11,642,259, and a continuation of application No. 17/083,587, filed on Oct. 29, 2020, now Pat. No. 11,110,017, and a continuation of application No. 16/278,217, filed on (Continued)

(51) Int. Cl.

| | |
|---|---|
| ***A61G 5/14*** | (2006.01) |
| ***A47C 1/034*** | (2006.01) |
| ***A47C 7/50*** | (2006.01) |

(52) U.S. Cl.

CPC .............. *A61G 5/14* (2013.01); *A47C 1/0342* (2013.01); *A47C 7/506* (2013.01); *A47C 7/5068* (2018.08)

(58) Field of Classification Search

CPC ......... A47C 1/0342; A47C 3/20; A47C 7/506; A47C 7/5068; A61G 5/14

USPC ............. 297/84, 423.34, 423.35, 423.36, 76, 297/85 M, DIG. 10

See application file for complete search history.

(56) References Cited

U.S. PATENT DOCUMENTS 3,964,786 A * 6/1976 Mashuda ............... A61G 5/006 297/DIG. 10

5,366,036 A * 11/1994 Perry ..................... A61G 5/006 180/907

(Continued)

*Primary Examiner* — Milton Nelson, Jr.

(74) *Attorney, Agent, or Firm* — Meister Seelig & Fein PLLC

(57) ABSTRACT

An armchair comprising a seat chassis supported on a support chassis by a pair of support columns, a chair back structure pivotally attached to a rear end of the seat chassis and to the support chassis, and a leg support structure pivotally attached to a front end of the seat chassis and connected to a beam, wherein the beam is attached the chair back structure. A first actuating device is mounted to the chair back, where a protracting end of the first actuating device is connected to the seat chassis. The armchair further comprises a second actuating device mounted to the support chassis, a footrest connected to a protracting end of the second actuating device, a third actuating device attached to the seat chassis, and a seating structure connected to a protracting end of the third actuating device and mounted above the seat chassis, wherein the seating structure includes an operative position projecting upwards and forwards by the third actuating device at a tilting angle from the seat chassis.

30 Claims, 19 Drawing Sheets

Related U.S. Application Data

Feb. 18, 2019, now Pat. No. 10,857,049, and a continuation of application No. 15/130,392, filed on Apr. 15, 2016, now Pat. No. 10,245,195.

(56) References Cited

U.S. PATENT DOCUMENTS

| | | | | |
|---|---|---|---|---|
| 5,556,121 | A * | 9/1996 | Pillot | A61G 5/14 297/DIG. 10 |
| 6,089,593 | A * | 7/2000 | Hanson | A61G 7/0528 297/85 L |
| 7,472,920 | B2 * | 1/2009 | Chai | A61G 5/14 280/643 |

* cited by examiner

RECLINING ARMCHAIR WITH LIFTING SEAT AND EXTENDING FOOTREST

CROSS REFERENCE TO RELATED APPLICATIONS

The present application is a continuation and claims the benefit of U.S. patent application Ser. No. 17/393,141 titled "RECLINING ARMCHAIR WITH LIFTING SEAT AND EXTENDING FOOTREST" filed Aug. 3, 2021, which is a continuation and claims the benefit of U.S. Pat. No. 11,110,017 titled "RECLINING ARMCHAIR WITH LIFTING SEAT AND EXTENDING FOOTREST" filed Oct. 29, 2020, which is a continuation and claims the benefit of U.S. Pat. No. 10,857,049 titled "RECLINING ARMCHAIR WITH LIFTING SEAT AND EXTENDING FOOTREST" filed Feb. 18, 2019, which is a continuation and claims the benefit of U.S. Pat. No. 10,245,195 titled "RECLINING ARMCHAIR WITH LIFTING SEAT AND EXTENDING FOOTREST" filed Apr. 15, 2016, the disclosures of which are hereby incorporated by reference in their entirety. Counterpart applications including CA3020908A1, IL262343A, SG11201809074YA and WO2017180380A1, all titled "RECLINING ARMCHAIR WITH LIFTING SEAT AND EXTENDING FOOTREST," are currently pending.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The invention described herein generally relates to an armchair, and in particular, an armchair having a mechanism to help a user out of the armchair and a locking footrest for preventing the user from sliding down.

Description of the Related Art

Typical armchairs comprise a back rest, a seat and a footrest. A well-known type of reclining armchair has a footrest that extends forward. The problem with such reclining armchairs is the effort needed to move out of these upright and fully reclined positions. Elderly and handicapped people may not be able to emerge from these armchairs without additional assistance.

Many people are not able to maintain a stable and comfortable seated position either due to muscle weakness, joint pain, muscle spasm, loss of balance, pressure sores or joint stiffness. Any of these may result in the person sliding forwards in the chair, leaning over the arm of the chair, falling forwards in the chair or generally being uncomfortable. Additionally, existing armchairs do not prevent users from sliding down the seat when in a reclined position.

Being unable to maintain a stable sitting position, because of any of the reasons mentioned above, can be extremely tiring. A good deal of effort is expended when people have to stop themselves from sliding in the seat or falling forwards. There is thus a need to provide an armchair that is both comfortable and able to prevent a user from sliding down the armchair and assist the user to rise from the armchair in both the upright or fully reclined position.

SUMMARY OF THE INVENTION

The present invention provides an armchair comprising a seat chassis supported on a support chassis by a pair of support columns, a chair back structure pivotally attached to a rear end of the seat chassis and to the support chassis, and a leg support structure pivotally attached to a front end of the seat chassis and connected to a beam, wherein the beam is attached the chair back structure. A first actuating device is mounted to the chair back, where a protracting end of the first actuating device is connected to the seat chassis. The armchair further comprises a second actuating device mounted to the support chassis, a footrest connected to a protracting end of the second actuating device, a third actuating device attached to the seat chassis, and a seating structure connected to a protracting end of the third actuating device and mounted above the seat chassis, wherein the seating structure includes an operative position projecting upwards and forwards by the third actuating device at a tilting angle from the seat chassis.

According to one embodiment, the armchair further includes a reclining position that reclines the seat chassis, reclines the chair back structure, and raising the leg support structure. In a further embodiment, the reclining position further includes extension of the footrest from a recessed location under the seat chassis. The footrest may further lock in place at a specific position to secure a user in the armchair. The armchair may further comprise a slider attached to the chair back structure. The first actuating device, the second actuating device, and the third actuating device may include hydraulics, pneumatic lifts and electric linear actuators.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. The following detailed description is, therefore, not intended to be taken in a limiting sense.

Throughout the specification and claims, terms may have nuanced meanings suggested or implied in context beyond an explicitly stated meaning. Likewise, the phrase “in one embodiment” as used herein does not necessarily refer to the same embodiment and the phrase “in another embodiment” as used herein does not necessarily refer to a different embodiment. It is intended, for example, that claimed subject matter include combinations of exemplary embodiments in whole or in part.

Figure 1:
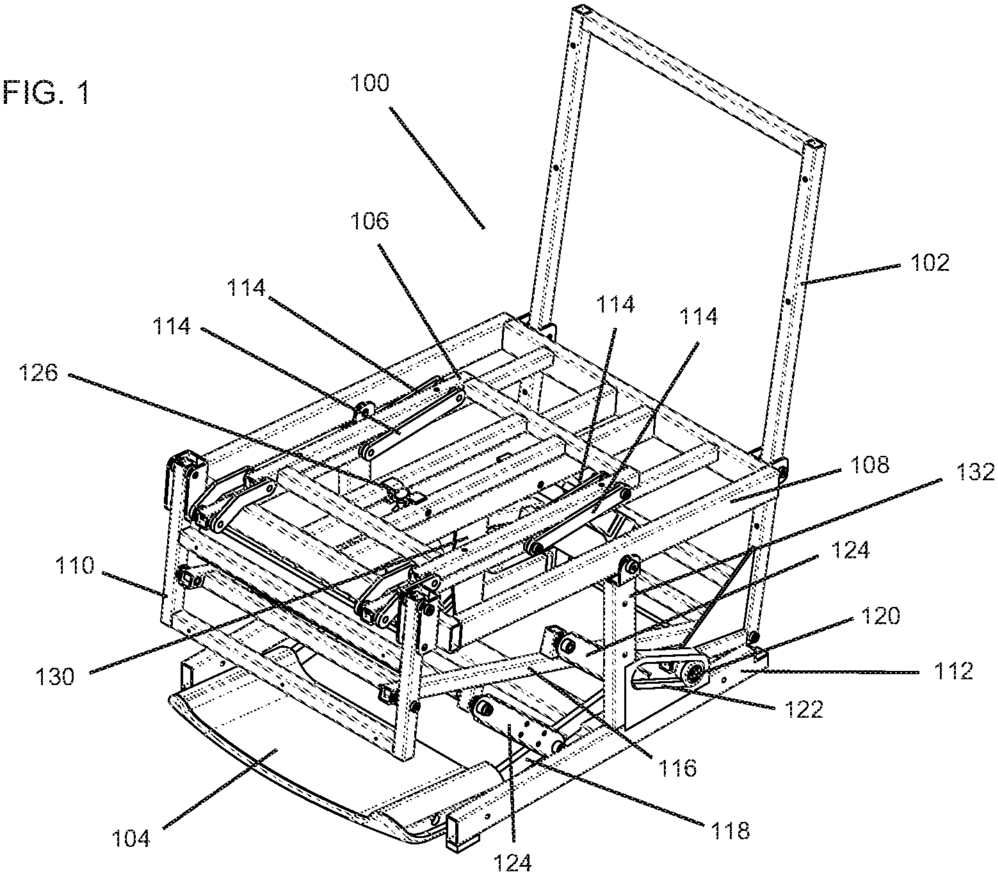
FIG. 1 illustrates a perspective view of an armchair frame in an upright position according to an embodiment of the present invention.

FIG. 1 provides a perspective view of an armchair frame in an upright position according to an embodiment of the present invention. Any of the components of the armchair frame described herein may be constructed from metal, wood, plastic, or a combination thereof, and secured together by screws, bolts, nuts, rivets, or any other suitable fasteners. Armchair frame 100 comprises a chair back structure 102, a footrest 104, a seating structure 106, a seat chassis 108, a leg support structure 110, and a support chassis 112, incorporating a backrest section, a seat section, a leg support section, and a footrest section in an adjustable structural relationship to one another. Seating structure 106 is mounted above seat chassis 108. A first end of seating structure 106 towards the chair back structure 102 is connected to two pairs of links 114 that are attached to a middle region of seat chassis 108. A second end of seating structure 106 is hinged to seat chassis 108 at a region of seat chassis 108 adjacent to the leg support structure 110. Leg support structure is pivotally attached to the front end of seat chassis 108. Seat chassis 108 is supported on support chassis 112 by support column 132 on each of left and right sides of armchair frame 100. The seat chassis 108 is further pivotally attached to chair back structure 102. Chair back structure 102 is also pivotally attached to support chassis 112.

Figure 2:
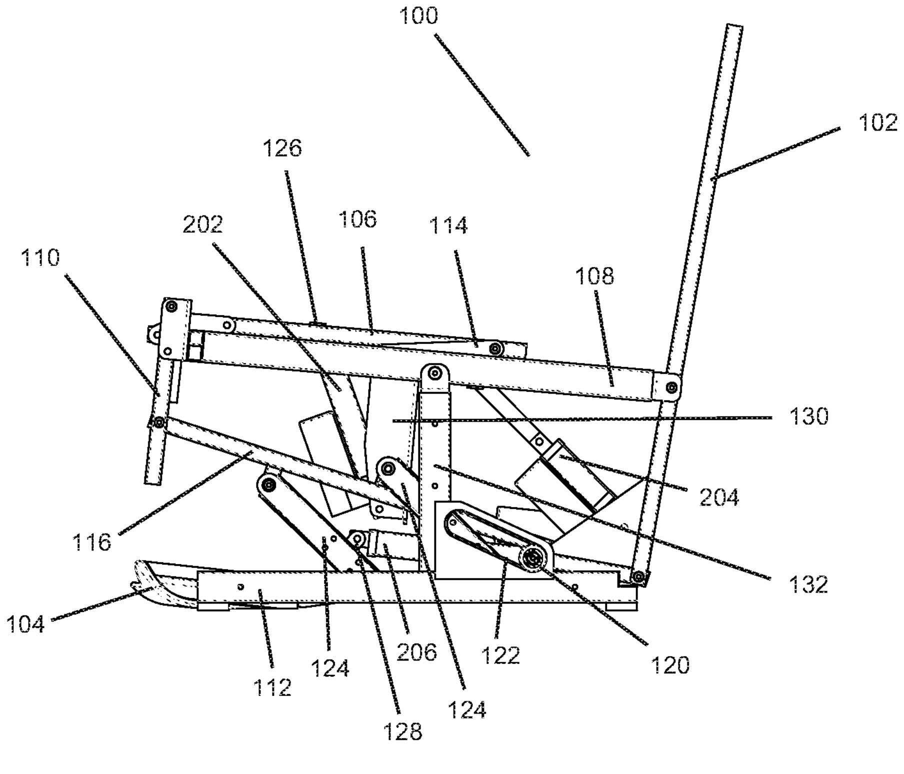
FIG. 2 illustrates side view of the armchair frame in the upright position according to an embodiment of the present invention.

FIG. 2 provides a side view of the armchair frame in the upright position according to an embodiment of the present invention. Seat actuator 202 is secured to seat chassis 108 by a bracket 130. Actuators as described herein may include devices such as hydraulics, pneumatic lifts or electric linear actuators. One or more of the actuators may be powered by a battery or AC/DC power source and electronically controlled by a switch, remote or button. The bracket 130 is attached to seat chassis 108 perpendicularly (or substantially perpendicular). A lift end of seat actuator 202 is attached to seating structure 106 via attachment 126. Seat actuator 202 is retracted when seating structure 108 is in an upright seated position.

Figure 3:
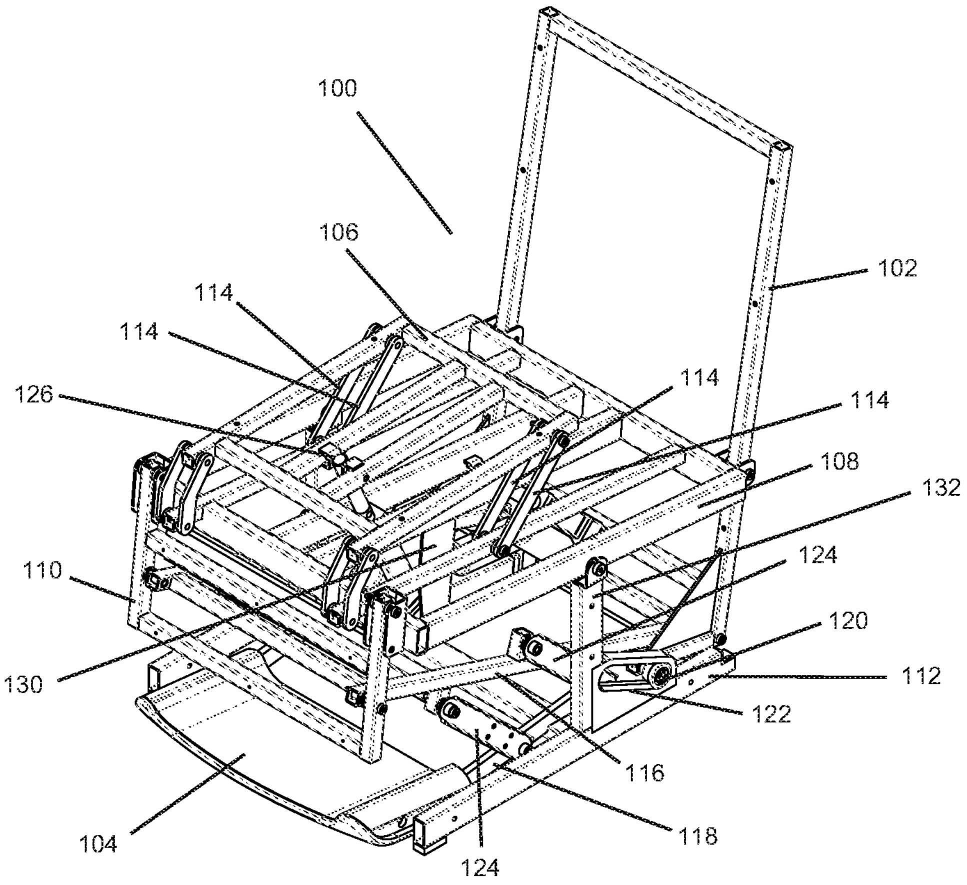
FIG. 3 illustrates a perspective view of the armchair frame in a lifted seat upright position according to an embodiment of the present invention.

FIG. 3 provides a perspective view of the armchair frame in a lifted seat upright position according to an embodiment of the present invention. Seat actuator 202 can be controlled by the user, to protract and detract. Protraction of seat actuator 202 pushes up and pivots seating structure 106 forward upon the seat chassis 108 at the edge of the seat (adjacent to the top of leg support structure 110) to assist a user to get up from an armchair including armchair frame 100.

Figure 4:
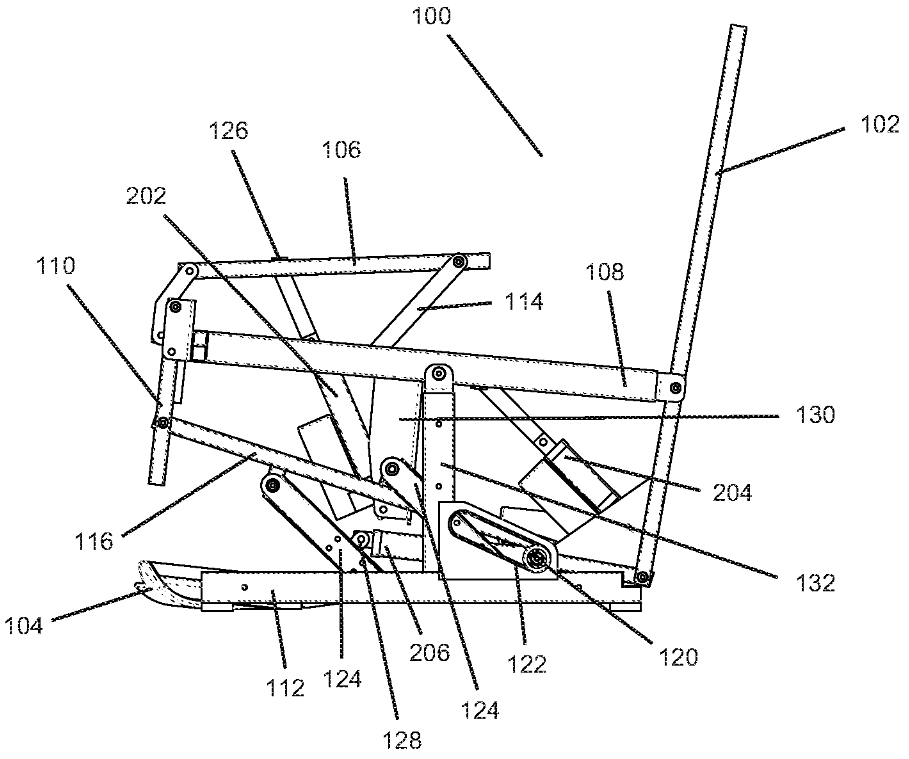
FIG. 4 illustrates side view of the armchair frame in the lifted seat upright position according to an embodiment of the present invention.

FIG. 4 provides a side view of the armchair frame in the lifted seat upright position according to an embodiment of the present invention. Seat actuator 202 is installed on bracket 130 at an angle relative to the perpendicular plane of the seat chassis 108 such that upon protraction of the seat actuator 202 pushes up on seating structure 106 to project seating structure 106 at an upward and forward tilt. Seat chassis 108 may be elevated to at least 12 cm from the center of the seat, while changing the angle from, for example, minus five degrees to plus five degrees relative to the seat chassis 108 in the upright position. The seating structure 106 may then be controlled to return downward into sitting position upon retraction of seat actuator 202. Seat actuator 202 may be retracted and protracted by a control panel. According to one embodiment, a sensor may be embedded in seating structure 106 to react to a user’s pressure or weight on the seat, and activate seat actuator 202 to retract automatically.

Figure 5:
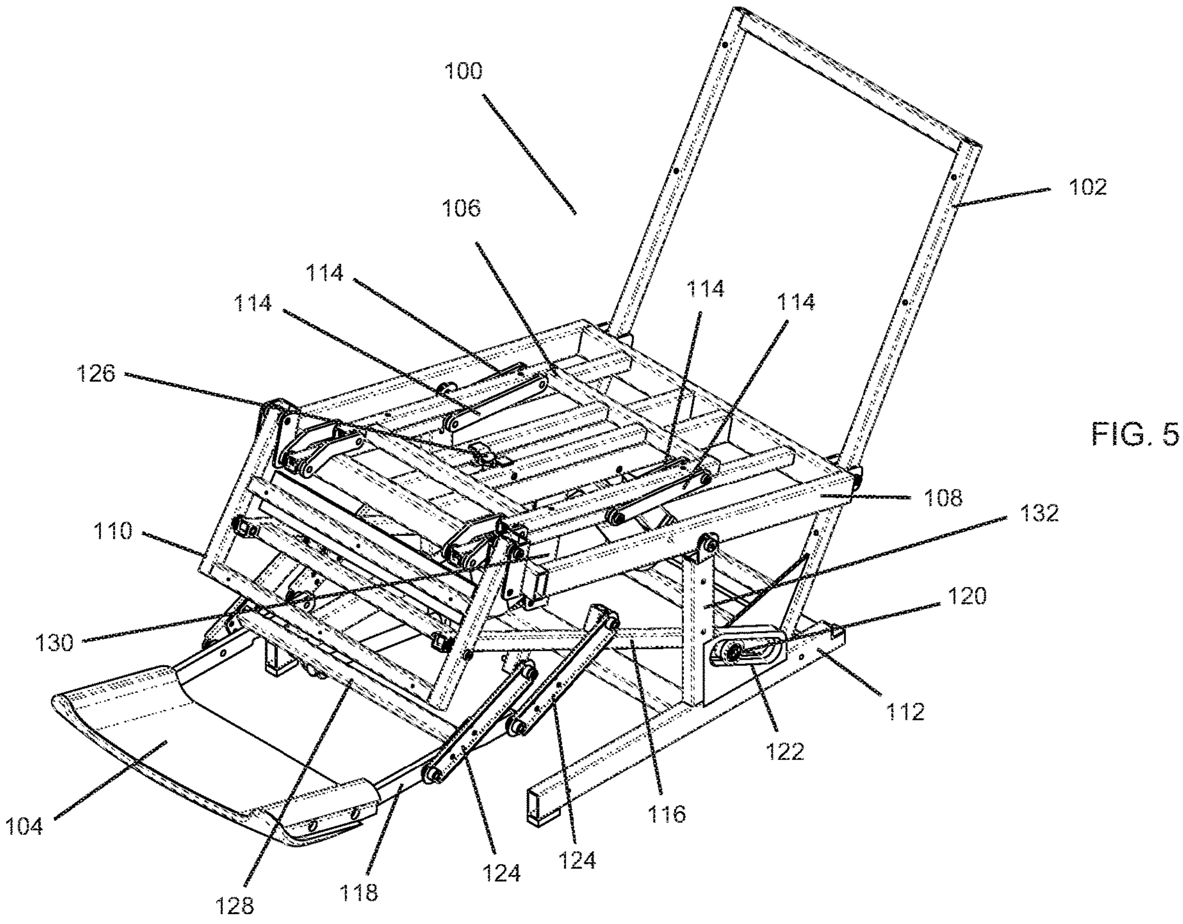
FIG. 5 illustrates a perspective view of the armchair frame in a reclined position according to an embodiment of the present invention.
Figure 6:
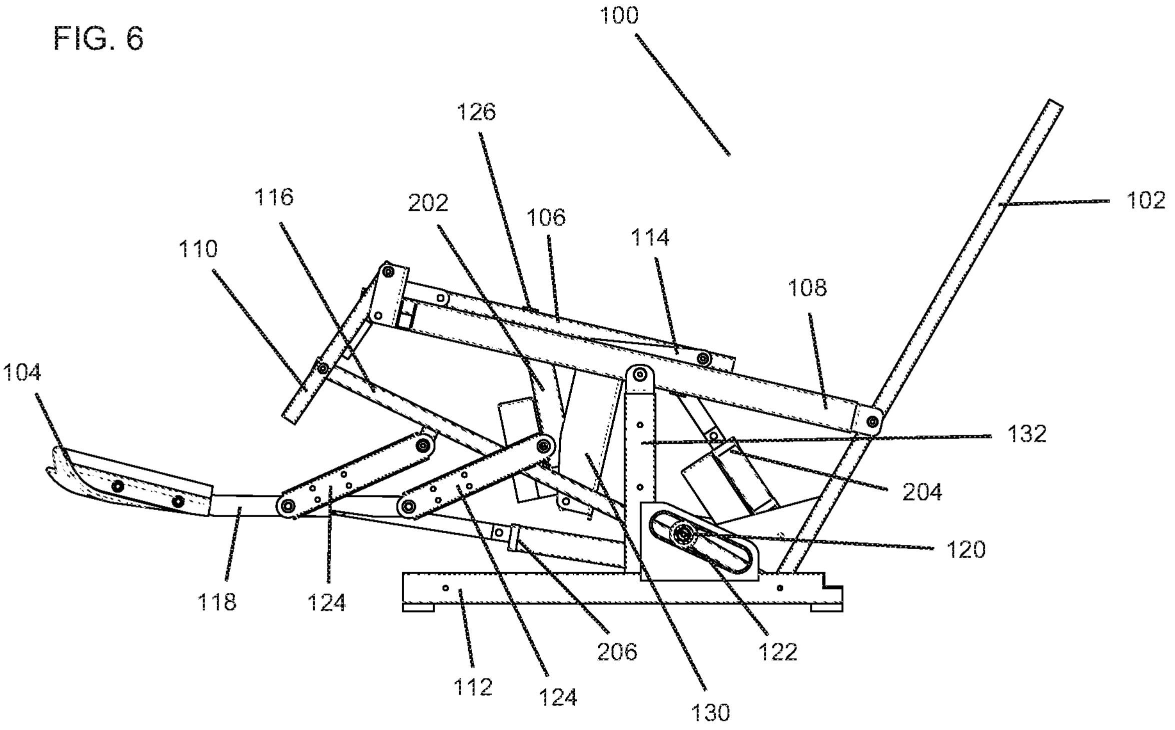
FIG. 6 illustrates side view of the armchair frame in the reclined position according to an embodiment of the present invention.

Recliner actuator 204 is mounted to chair back structure 102 and connected to seat chassis 108 for protraction to support seat chassis 108 in upright position. Armchair frame 100 may also be configured in a reclining position as illustrated in FIGS. 5 and 6. Reclining can produce three different movements simultaneously including reclining of the seat chassis 108 backwards, reclining of the chair back structure 102, and raising the leg support structure 110. These movements can be operated with the actuators which can be controlled by the user. For example, one press on a button can produce whole full movements for two directions—reclined and upright.

FIG. 6 provides a side view of the armchair frame in the reclined position according to an embodiment of the present invention. Upon reclining, recliner actuator 204 may retract to cause on each left and right sides, slider 120 connected to chair back structure 102 to slide upwards in slot 122, and allows seat chassis 108 to pivot on support column 132. Slider 120 may include a wheel to allow for rolling in slot 122. Chair back structure 102 is further attached to beam 116 on each left and right sides of the armchair frame 100. Beam 116 is connected to leg support structure 110. Reclining of chair back structure 102 pulls seat chassis 108 backwards and draw top of leg support structure 110 backwards while beam 116 pushes the bottom of leg support structure 110 causing leg support structure 110 to tilt upwards.

Footrest 104 may also be extended from its recessed location under seat chassis 108 in the reclined position in conjunction with the leg support structure 110 rising. According to one embodiment, movement of footrest 104 is dependent on the armchair's position. In reclined position, the footrest 104 may unfold itself from inside the armchair frame 100, and rise under the user's feet. Footrest actuator 206 is mounted to support chassis 112 and connected to support rod 128. The footrest actuator 206 may push the support rod 128 which is further connected to footrest arm 118 on both left and right sides. Footrest arm 118 on each of the left and right sides are also connected to links 124, and links 124 are connected to beam 116.

According to one embodiment, footrest 104 moves in conjunction with the chair back structure 102 to keep a person such as an elderly person from slipping down in their seat. Footrest 104 may be configured to lock in place at a specific position that helps secure users in place in the chair so they don't slide down. The footrest 104 may further include a lip and/or friction surface to keep a user's feet on the footrest 104. Footrest 104 may extend out to various lengths. Extension of footrest 104 may stop either automatically when it touches the feet (e.g., via a sensor), controlled by the user, or when it reaches the end of its movement range. Alternatively, footrest 104 may be extended to preconfigured lengths for short and tall persons. When the user operates the armchair frame 100 from its reclined position back to its upright position, the footrest 104 may automatically fold itself back into its recessed location under seat chassis 108.

It should be noted that illustrated components of the armchair frame 100 including, but not limited to, support chassis 112, links 114, beam 116, footrest arm 118, slider 120, slot 122, links 124, and support column 132, are substantially identical on both left and right sides of armchair frame 100.

Figure 7:
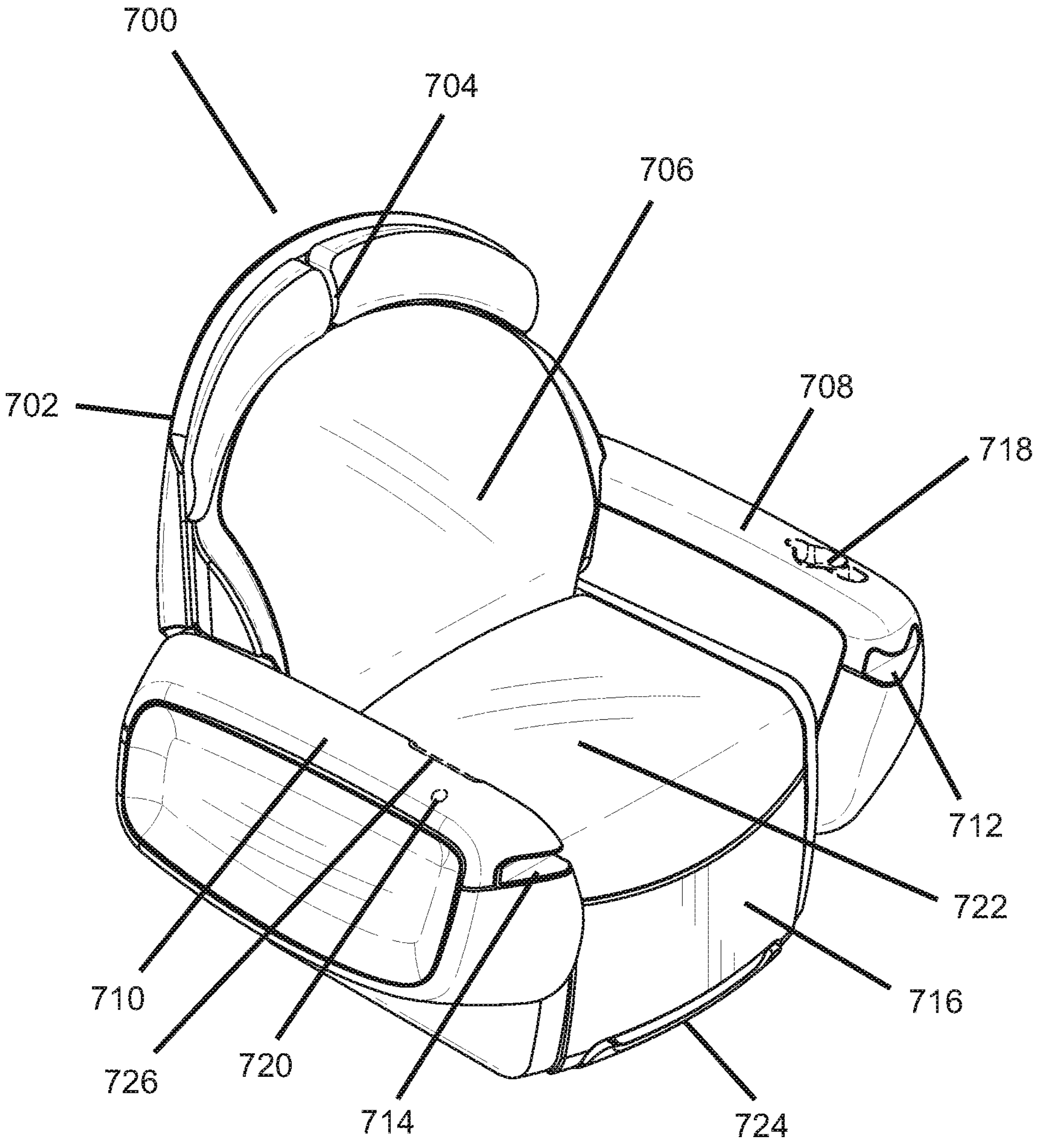
FIG. 7 illustrates a perspective view of an armchair in an upright position according to an embodiment of the present invention.

FIG. 7 provides a perspective view of an armchair in an upright position according to an embodiment of the present invention. Armchair 700 is inclusive of the armchair frame 100 as previously illustrated in FIG. 1 through FIG. 6. For example, the armchair 700 may provide, in various components, cushions and trim covering the armchair frame 100. Cushions may be comprised of plastic, faux, or leather coverings including cotton or foam padding. Trim may include plastic, wood, or any other suitable material. Armchair 700 comprises chair back 702, armrest 708, armrest 710, seat 722, leg support 716, and footrest 724. Chair back 702 includes headrest section 704 and back section 706. Armrest 708 and armrest 710 includes a finger grip recess 712 and finger grip recess 714 respectively.

Figure 8:
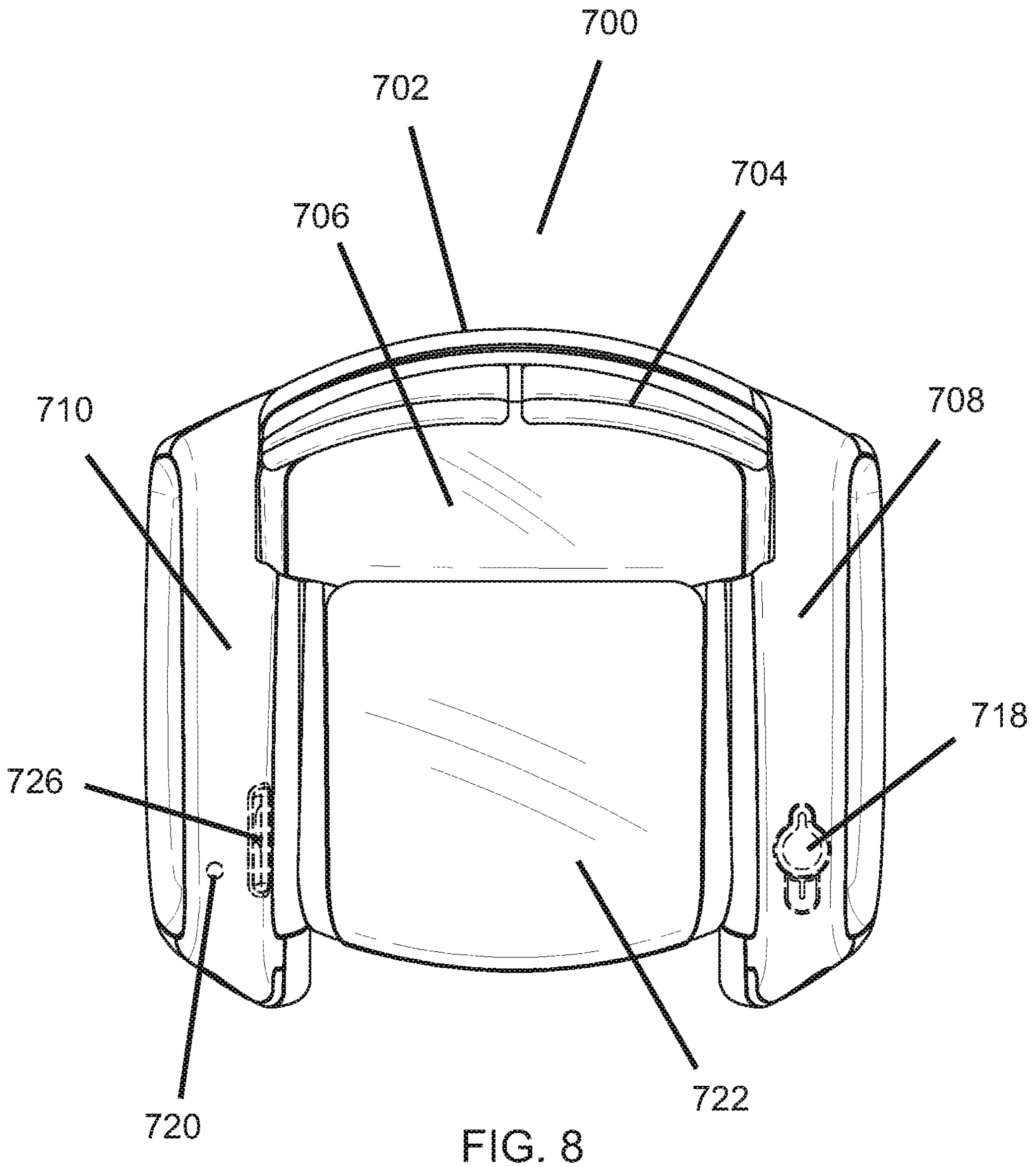
FIG. 8 illustrates a top view of the armchair in an upright position according to an embodiment of the present invention.
Figure 9:
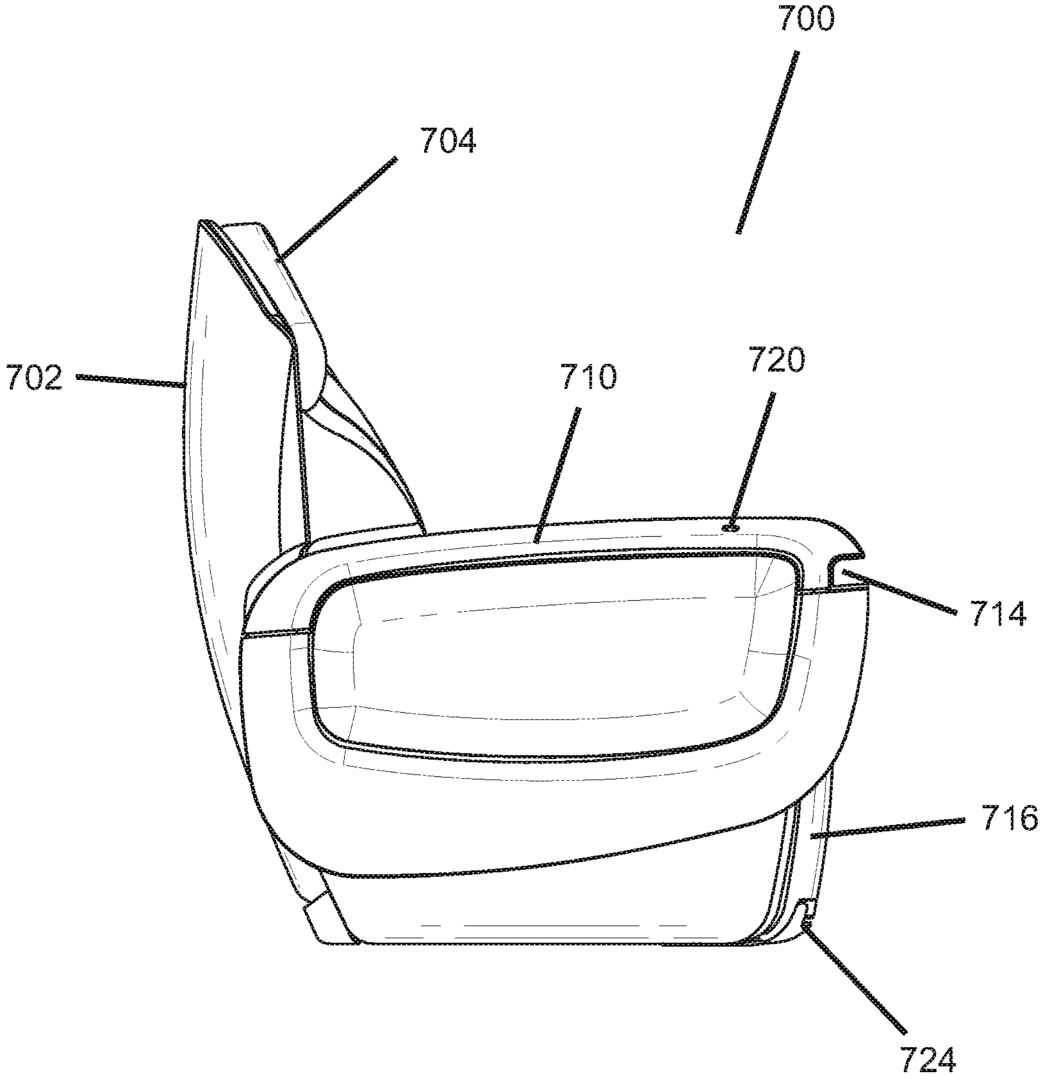
FIG. 9 illustrates a left view of the armchair in an upright position according to an embodiment of the present invention.
Figure 10:
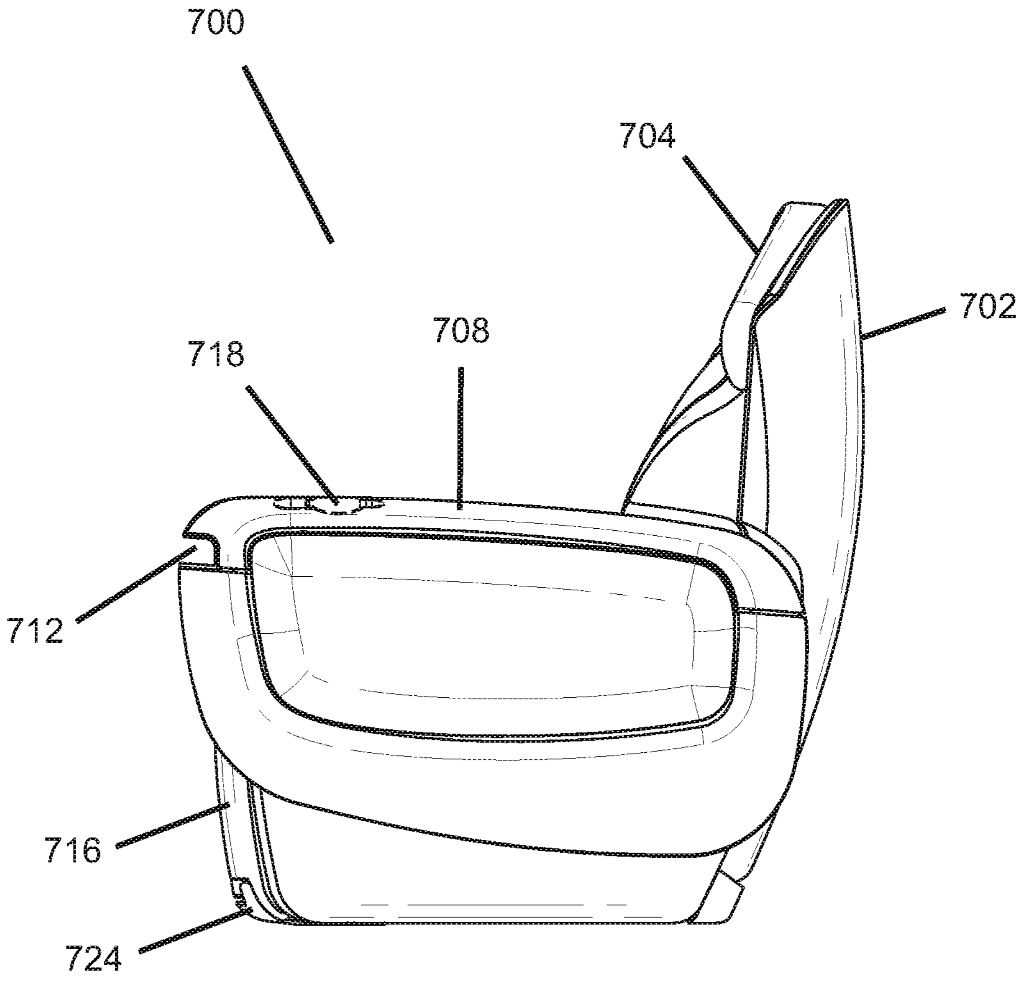
FIG. 10 illustrates a right view of the armchair in an upright position according to an embodiment of the present invention.
Figure 11:
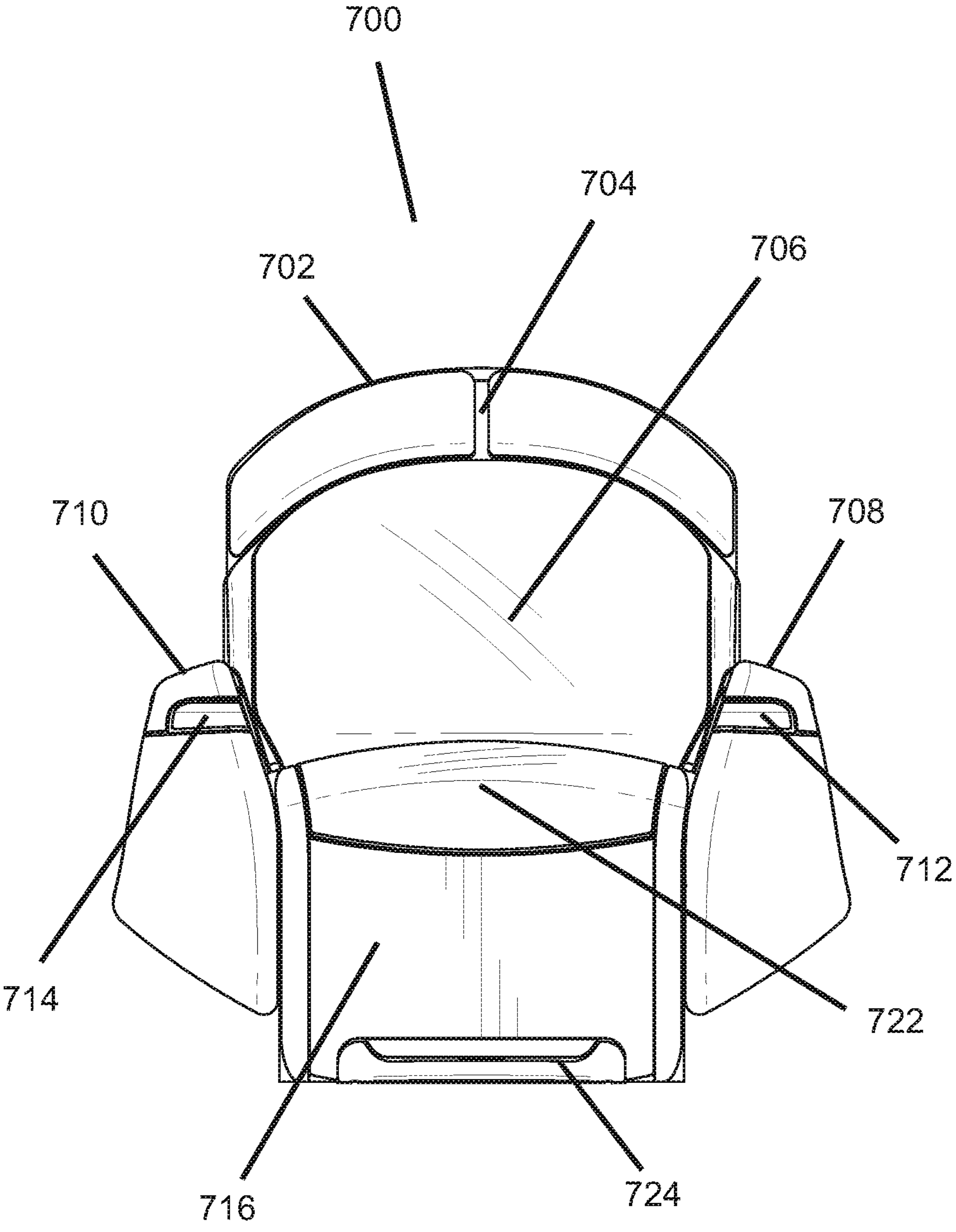
FIG. 11 illustrates a front view of the armchair in an upright position according to an embedment of the present invention.

FIG. 8 provides a top view of the armchair. As illustrated, armrest 708 may also include holder 718 for placing a cup, mobile phone, or appliance remote. Armrest 710 may include a control panel 726 including buttons for controlling operations of the chair such as reclining, raising seat 722, or extending the footrest 724. Armrest 710 may further include a slot 720 for insertion of an accessory such as a tray or table. One of armrest 708 and 710, or holder 718 and control panel 726 may also include an outlet, port, or device charging station. It is noted that armrest 708 and armrest 710 may include other features and feature configurations that are not depicted in the figures. FIG. 9, FIG. 10, and FIG. 11 provide additional views of the left, right, and front side views of the armchair 700, respectively.

Figure 12:
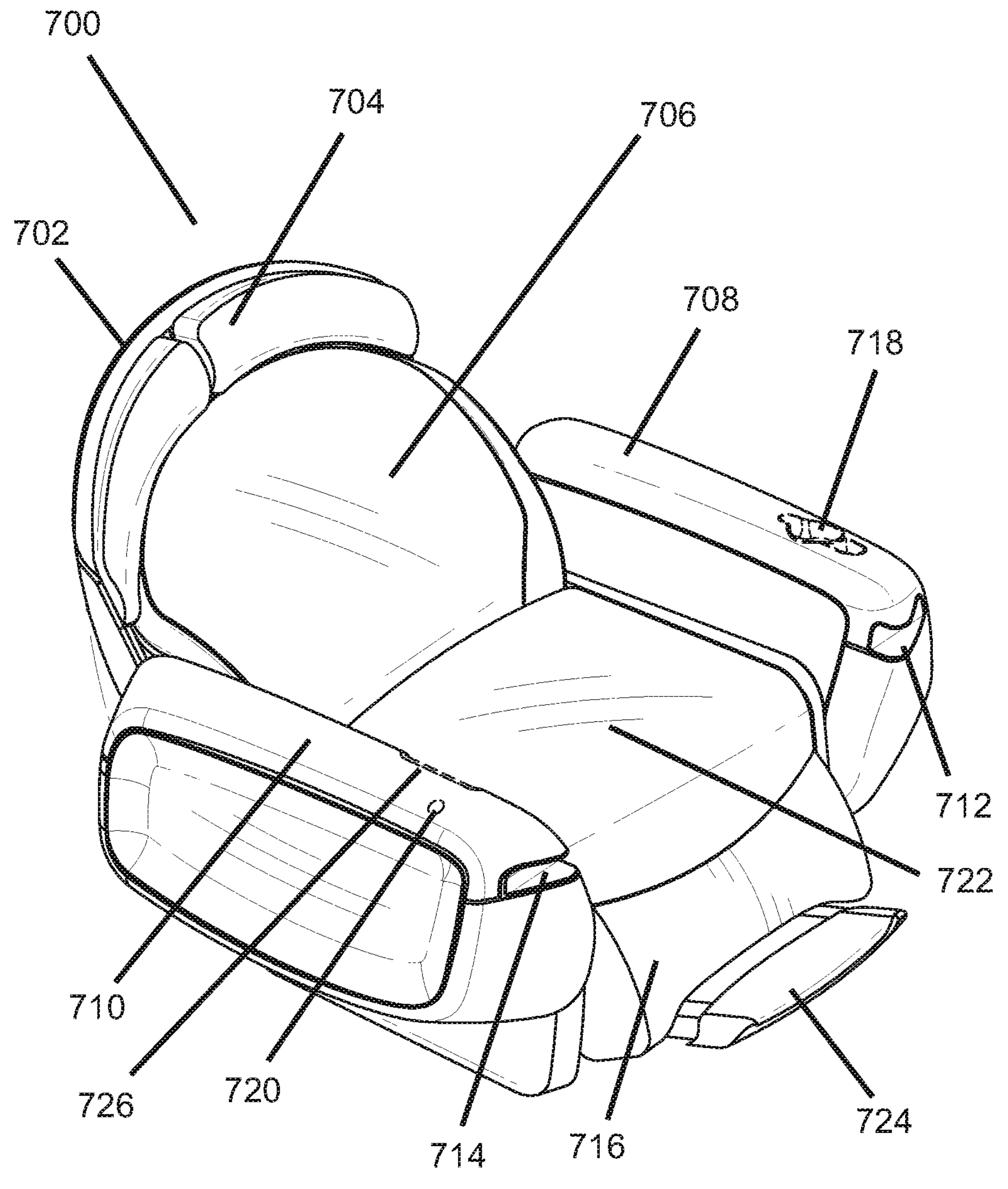
FIG. 12 illustrates a perspective view of the armchair in a reclined position according to an embodiment of the present invention.

Chair back 702 may contain chairback structure 102 while leg support 716 may contain leg support structure 110. The armchair 700 may be further configured to a reclining position where chair back 702 may be reclined backwards along with rising the leg support 716. Footrest 724 may also be extended from a recess below leg support 716. FIG. 12 illustrates a perspective view of the armchair in a reclined position according to an embodiment of the present invention. Chair back 702 can be reclined backwards while leg support 716 is tilted outwards along with footrest 724 simultaneously extending a predetermined length to prevent a user from slipping down the chair.

Figure 13:
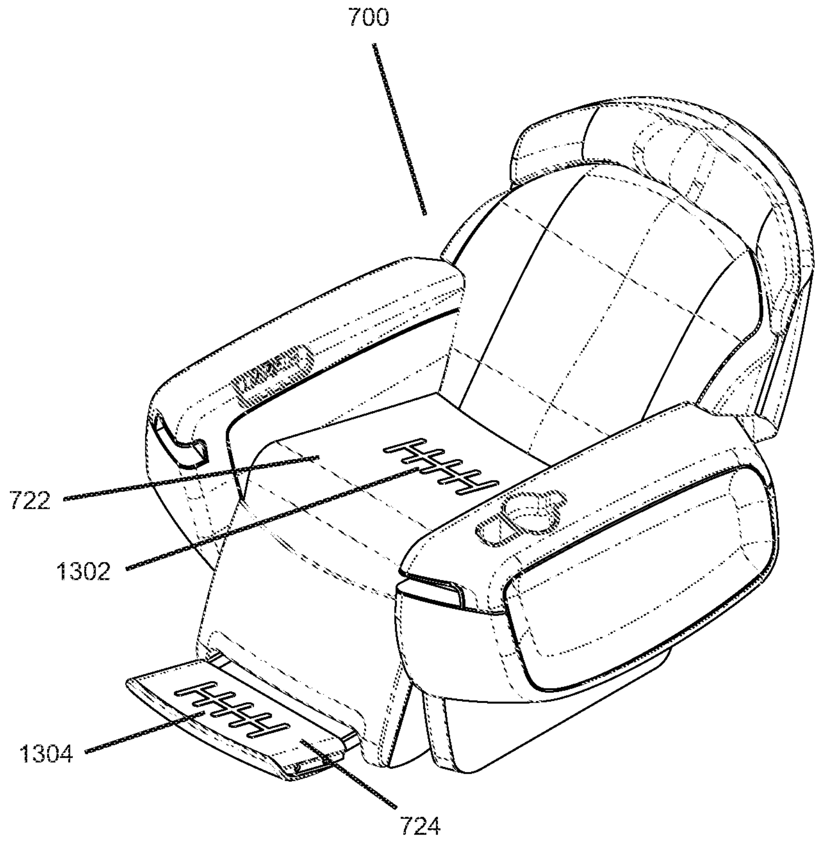
FIG. 13 illustrates exemplary depictions of sensors in the armchair according to an embodiment of the present invention.
Figure 14:
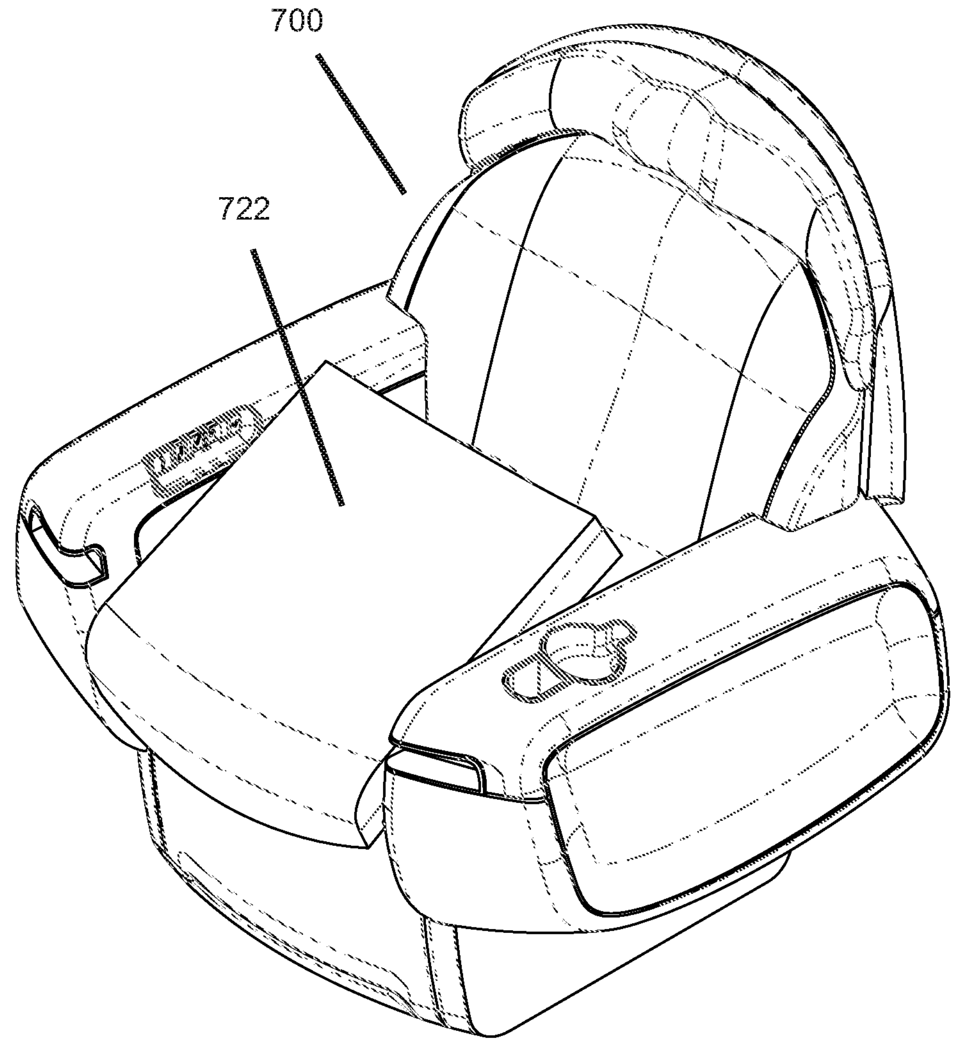
FIG. 14 illustrates a perspective view of the armchair in a lifted seat upright position according to an embodiment of the present invention.
Figure 15:
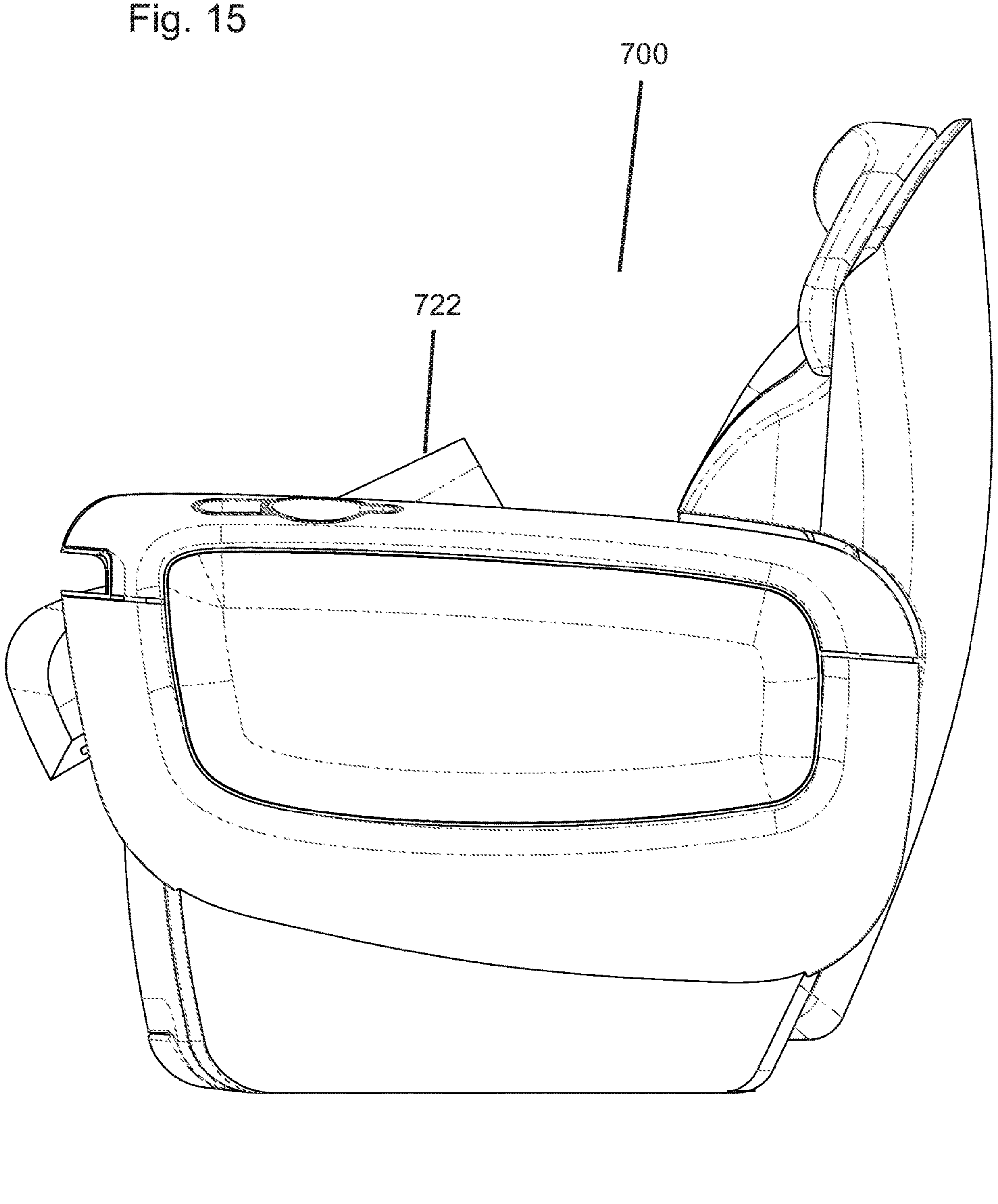
FIG. 15 illustrates a side view of the right view of the armchair in the lifted seat upright position according to an embodiment of the present invention.

FIG. 13 provides exemplary depictions of sensors in the armchair according to an embodiment of the present invention. Seat 722 may be configured on seating structure 106 where seat 722 may be controlled by a user to lift and tilt forward to assist a user in getting up from or sitting down in armchair 700. A seat sensor 1302 may be embedded in the seat 722 to detect a user's weight on the chair (e.g., embedded in the cushioning of seat 722). According to one embodiment, a button to control seat 722 by seat actuator 202 may be activated in control panel 726 to elevate and tilt forward (as illustrated in FIG. 14 and FIG. 15). The button to control seat 722 may be held or long-pressed to a desired height and tilt. Alternatively, the button to control seat 722 may be pressed once to raise and tilt seat 722 to a preconfigured height and tilt.

The user may lean on seat 722 to sit down and seat sensor 1302 may react to the pressure of the user's weight, and move back down to a sitting position (lowered and tilted backwards). When the user desires to get up, the button to control seat 722 may be pressed to raise and tilt the seat 722 forward. Upon leaving the seat 722, seat sensor 1302 is configurable to detect that no weight is on the seat 722, and after a period of time (e.g., several minutes, in a range of 1-2 minutes, or 90 seconds), seat actuator 202 may be controlled to automatically return to the sitting position.

A footrest sensor 1304 may be embedded in footrest 724. Footrest sensor 1304 may be used to adjust to different sizes of legs. When a user adjusts to chair to a reclining position, footrest actuator 206 raises footrest 724 automatically and simultaneously from underneath the chair 700. When the user's feet touches the footrest 724, footrest sensor 1304 detects the weight of the feet and stops footrest actuator 206 from rising footrest 724 any higher. The user may press a button to control footrest 724 in the control panel 726 to continue rising or lowering the footrest 724 as desired by the user.

It is noted that the particular shape and configuration of the outer portion of the armchair 700 covering the armchair frame 100 with respect to the description of FIG. 7 through FIG. 15, including the cushions, trim, chairback 702, armrests 708 and 710, etc., are merely exemplary and can be varied.

Figure 16:
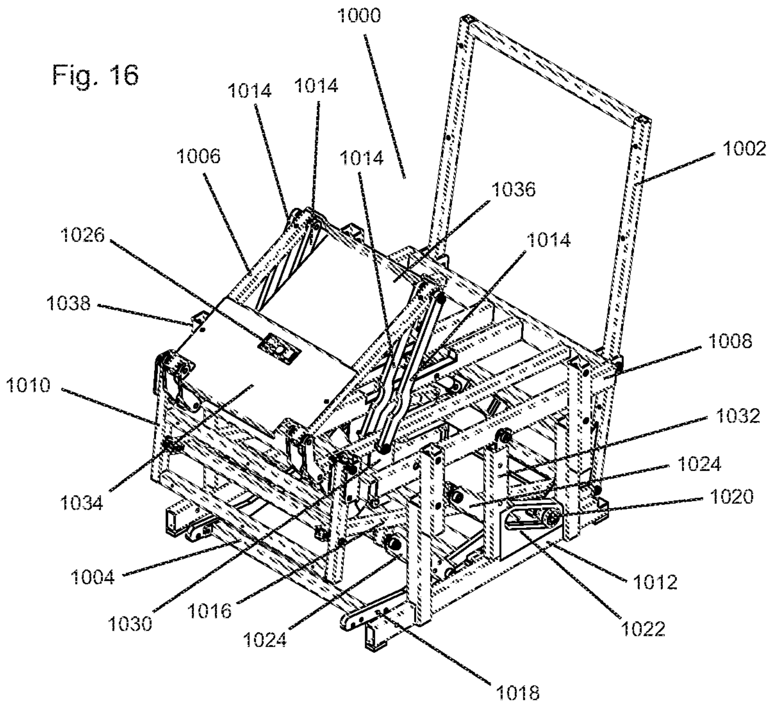
FIG. 16 illustrates a perspective view of an armchair frame in a lifted seat upright position according to another embodiment of the present invention.
Figure 17:
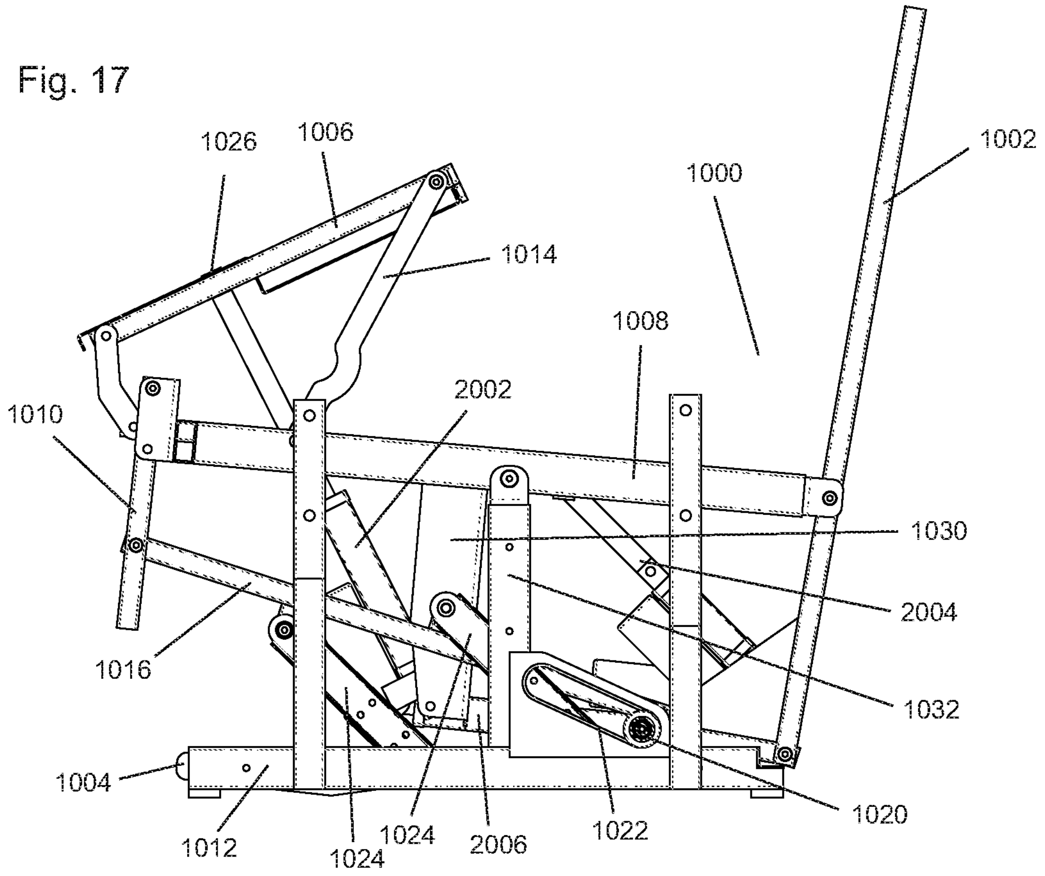
FIG. 17 illustrates a side view of the armchair frame in the lifted seat upright position according to another embodiment of the present invention.

Armchair 700 may alternatively include the armchair frame illustrated in FIG. 16-19. FIG. 16 and FIG. 17 present a frame of the armchair in a lifted seat upright position according to another embodiment. Armchair frame 1000 comprises a chair back structure 1002, a footrest rail 1004, a seating structure 1006, a seat chassis 1008, a leg support structure 1010, and a support chassis 1012, incorporating a backrest section, a seat section, a leg support section, and a footrest section in an adjustable structural relationship to one another. Seating structure 1006 is mounted above seat chassis 1008. A plate 1034 is installed on the surface of seating structure 1006. Plate 1034 and surface 1036 may provide a barrier between a seat cushion and the seating structure 1006.

A first end of seating structure 1006 towards the chair back structure 1002 is connected to two pairs of links 1014 that are attached to a front region of seat chassis 1008. A second end of seating structure 1006 is hinged to seat chassis 1008 at a region of seat chassis 1008 adjacent to the leg support structure 1010. Leg support structure is pivotally attached to the front end of seat chassis 1008. Seat chassis 1008 is supported on support chassis 1012 by support column 1032 on each of left and right sides of armchair frame 1000. The seat chassis 1008 is further pivotally attached to chair back structure 1002. Chair back structure 1002 is also pivotally attached to support chassis 1012.

FIG. 17 provides a side view of the frame of armchair frame in the upright position. Seat actuator 2002 is secured to seat chassis 1008 by a bracket 1030. The bracket 1030 is attached to seat chassis 1008 perpendicularly (or substantially perpendicular). Plate 1034 includes an aperture for attachment 1026. A lift end of seat actuator 2002 is attached to seating structure 1006 via the attachment 1026. Seat actuator 2002 is retracted when seating structure 1008 is in an upright seated position. The seat actuator 2002 is installed on bracket 1030 at an angle relative to the perpendicular plane of the seat chassis 1008 such that upon protraction of the seat actuator 2002 pushes up on seating structure 1006 to project seating structure 1006 at an upward and forward tilt. Seat chassis 1008 may be elevated to at least 12 cm from the center of the seat while changing the angle relative to the seat chassis 1008 in the upright position. The seating structure 1006 is controllable to return downward and backwards into sitting position by retracting seat actuator 2002. Seat actuator 2002 may be retracted and protracted by a control panel. According to one embodiment, a sensor may be embedded in seating structure 1006 to react to a user's pressure or weight on the seat, and activate seat actuator 2002 to retract automatically. In another embodiment, the sensor may be placed on plate 1034 or between plate 1034 and surface 1036.

Figure 18:
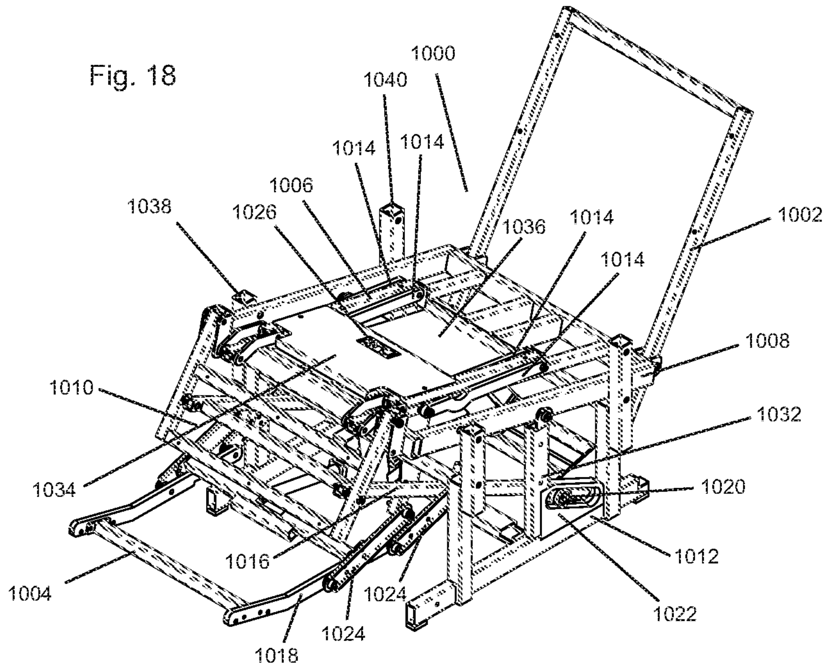
FIG. 18 illustrates a perspective view of the armchair frame in a reclined position according to another embodiment of the present invention.
Figure 19:
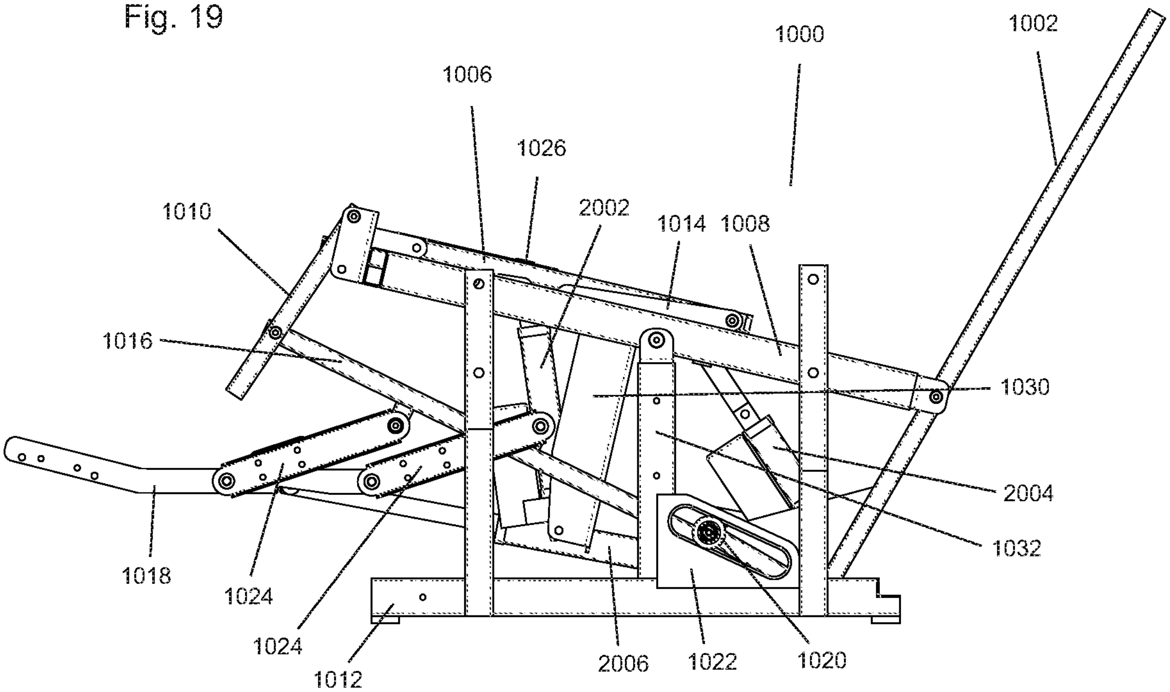
FIG. 19 illustrates side view of the armchair frame in the reclined position according to another embodiment of the present invention.

FIG. 18 and FIG. 19 present armchair frame 1000 in a reclined position. Recliner actuator 2004 is mounted to chair back structure 1002 and connected to seat chassis 1008 for protraction to support seat chassis 1008 in upright position. Armchair frame 1000 may also be configured in a reclining position as illustrated in FIGS. 18 and 19. Upon reclining, recliner actuator 2004 may retract to cause on each left and right sides, slider 1020 connected to chair back structure 1002 to slide upwards in slot 1022, and allows seat chassis 1008 to pivot on support column 1032. Slider 1020 may include a wheel to allow for rolling in slot 1022. Chair back structure 1002 is further attached to beam 1016 on each left and right sides of the armchair frame 1000. Beam 1016 is connected to leg support structure 1010. Reclining of chair back structure 1002 pulls seat chassis 1008 backwards and draw top of leg support structure 1010 backwards while beam 1016 pushes the bottom of leg support structure 1010 causing leg support structure 1010 to tilt upwards.

Footrest 1004 may also be extended from its recessed location under seat chassis 1008 in the reclined position in conjunction with the leg support structure 1010 rising. In reclined position, the footrest 1004 may unfold itself from inside the armchair frame 1000, and rise under the user's feet. Footrest actuator 2006 is mounted to support chassis 1012 and connected to support rod 1028. The footrest actuator 2006 may push the support rod 1028 which is further connected to footrest arm 1018 on both left and right sides. Footrest arm 1018 on each of the left and right sides are also connected to links 1024, and links 1024 are connected to beam 1016. Components of the armchair frame 1000 including, but not limited to support chassis 1012, links 1014, beam 1016, footrest arm 1018, slider 1020, slot 1022, links 1024, and support column 1032, are substantially identical on both left and right sides of armchair frame 1000.

FIGS. 1 through 19 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. An armchair comprising:

a seat chassis supported on a support chassis by one or more support columns;

a leg support structure pivotally attached to a front end of the seat chassis;

a first actuating device attached to the seat chassis; and a seating structure connected to a protracting end of the first actuating device and mounted above the seat chassis, wherein the seating structure includes an operative position projecting upwards and forwards by the first actuating device at a tilting angle from the seat chassis to assist a user to get up from the armchair and a reclining position of the seating structure that reclines the seat chassis downwards and backwards by the first actuating device, wherein the reclining position further extends a footrest from a recessed location under the seat chassis, wherein the footrest further locks in place at a specific position to secure a user in the armchair.

2. The armchair of claim 1, wherein the seating structure in the operative position is at a tilted angle with respect to the seat chassis of up to 5 degrees.

3. The armchair of claim 1, wherein the seating structure in the operative position is projected upwards by up to 12 cm from the seat chassis.

4. The armchair of claim 1, further comprising a sensor embedded in the seating structure to react to a user's pressure or weight on the seating structure and activate the first actuating device to retract automatically.

5. The armchair of claim 4, wherein the sensor embedded in the seating structure is configurable to detect that no weight is on the seating structure for a period of time and to thereafter activate the first actuating device to automatically return the seating structure to a sitting position.

6. The armchair of claim 1, further comprising a chair back structure pivotally attached to a rear end of the seat chassis and to the support chassis.

7. The armchair of claim 6, further comprising a slider connected to the chair back structure.

8. The armchair of claim 7, further comprising a recliner actuator mounted to the chair back structure and connected to the seat chassis, the recliner actuator configured to bring the armchair to the reclining position.

9. The armchair of claim 8, wherein the slider comprises a wheel for allowing the slider to roll within a slot.

10. The armchair of claim 9, wherein the recliner actuator causes the slider to slide upwards in the slot and allows the seat chassis to pivot on the one or more support columns.

11. The armchair of claim 1, wherein the footrest is connected to a protracting end of a second actuating device mounted to the support chassis.

12. The armchair of claim 11, wherein the footrest is configured to lock in place at a specific position that helps secure a user from sliding down in the armchair.

13. The armchair of claim 12, wherein the footrest comprises a lip or friction surface to keep the user's feet on the footrest.

14. The armchair of claim 11, wherein the footrest is configured to extend out from the armchair to a plurality of lengths.

15. The armchair of claim 14, wherein the footrest comprises a sensor to detect the touching of feet on the footrest, and wherein the footrest is configured to stop extending automatically when the sensor detects the feet touching.

16. An armchair comprising:

a seat chassis supported on a support chassis by one or more support columns;

a leg support structure pivotally attached to a front end of the seat chassis;

a first actuating device attached to the seat chassis;

a seating structure connected to a protracting end of the first actuating device and mounted above the seat chassis, wherein the seating structure includes an operative position projecting upwards and forwards by the first actuating device at a tilting angle from the seat chassis to assist a user to get up from the armchair; and a sensor embedded in the seating structure to react to a user's pressure or weight on the seating structure and activate the first actuating device to retract automatically.

17. The armchair of claim 16, further including a reclining position of the seating structure that reclines the seat chassis downwards and backwards by the first actuating device, wherein the reclining position further extends a footrest from a recessed location under the seat chassis, wherein the footrest further locks in place at a specific position to secure a user in the armchair.

18. The armchair of claim 16, wherein the seating structure in the operative position is at a tilted angle with respect to the seat chassis of up to 5 degrees.

19. The armchair of claim 16, wherein the seating structure in the operative position is projected upwards by up to 12 cm from the seat chassis.

20. The armchair of claim 16, wherein the sensor embedded in the seating structure is configurable to detect that no weight is on the seating structure for a period of time and to thereafter activate the first actuating device to automatically return the seating structure to a sitting position.

21. The armchair of claim 16, further comprising a chair back structure pivotally attached to a rear end of the seat chassis and to the support chassis.

22. The armchair of claim 21, further comprising a slider connected to the chair back structure.

23. The armchair of claim 22, further comprising a recliner actuator mounted to the chair back structure and connected to the seat chassis, the recliner actuator configured to bring the armchair to a reclining position.

24. The armchair of claim 23, wherein the slider comprises a wheel for allowing the slider to roll within a slot.

25. The armchair of claim 24, wherein the recliner actuator causes the slider to slide upwards in the slot and allows the seat chassis to pivot on the one or more support columns.

26. The armchair of claim 16, further comprising a footrest connected to a protracting end of a second actuating device mounted to the support chassis.

27. The armchair of claim 26, wherein the footrest is configured to lock in place at a specific position that helps secure a user from sliding down in the armchair.

28. The armchair of claim 27, wherein the footrest comprises a lip or friction surface to keep the user's feet on the footrest.

29. The armchair of claim 26, wherein the footrest is configured to extend out from the armchair to a plurality of lengths.

30. The armchair of claim 29, wherein the footrest comprises a sensor to detect the touching of feet on the footrest, and wherein the footrest is configured to stop extending automatically when the sensor detects the feet touching.

* * * * *